Dec. 5, 1944.    R. S. KENRICK    2,364,372
AUTOMATIC SAFETY CONTROL FOR ARC WELDING
Filed Sept. 7, 1942    2 Sheets-Sheet 1

INVENTOR:
RALPH S. KENRICK
by Oscar Hochberg.
HIS ATTORNEY

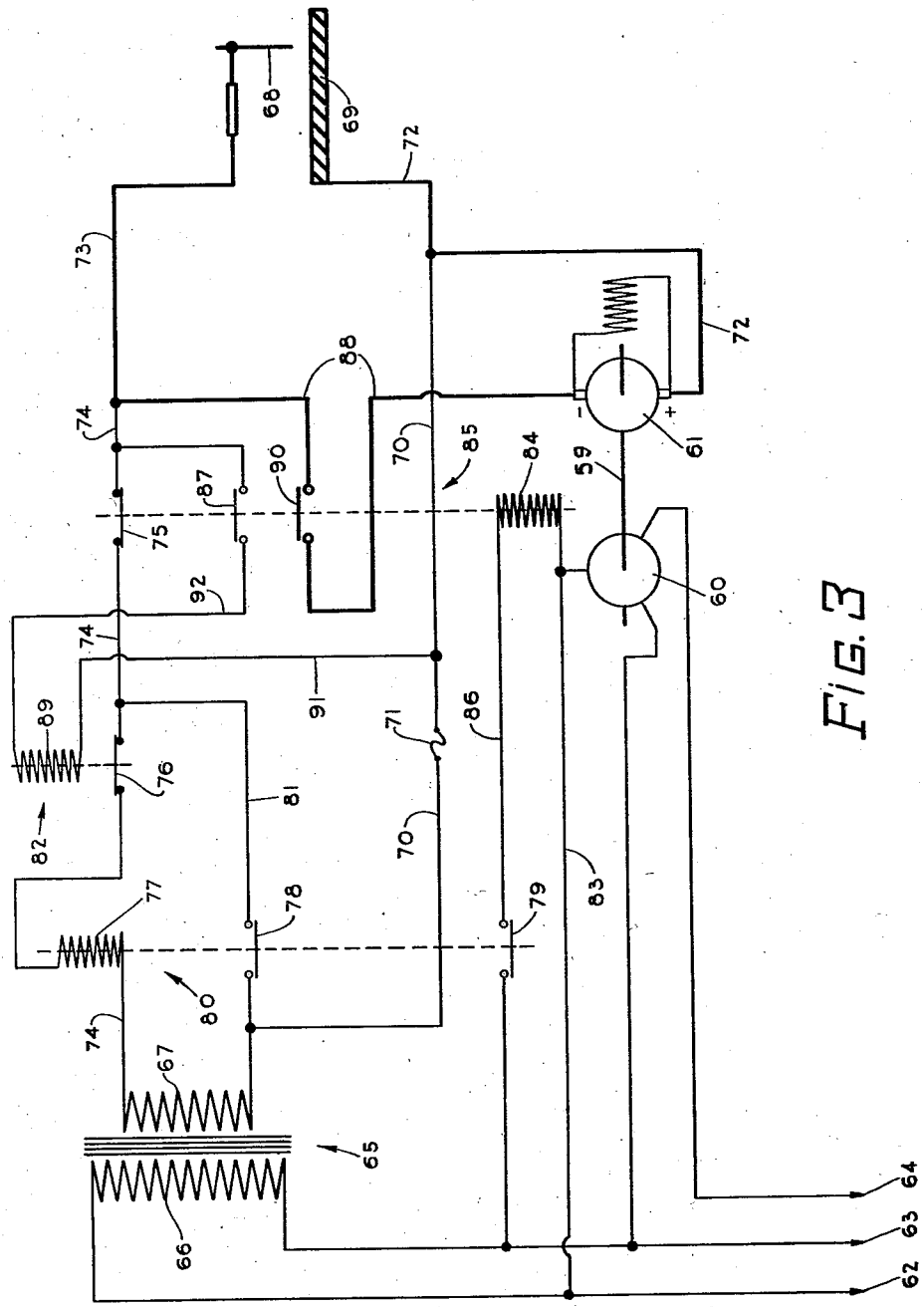

Patented Dec. 5, 1944

2,364,372

UNITED STATES PATENT OFFICE 2,364,372

AUTOMATIC SAFETY CONTROL FOR ARC WELDING

Ralph S. Kenrick, Chicago, Ill., assignor to Pullman-Standard Car Manufacturing Company, Chicago, Ill., a corporation of Delaware Application September 7, 1942, Serial No. 457,551

10 Claims. (Cl. 171—119)

This invention relates to electric arc welding circuits with means designed to isolate the high open-circuit voltage of the welding transformer from the electrode holder when the operator breaks the arc and stops welding.

An important object of the invention is to provide means automatically to effect the opening of the primary circuit of the welding transformer to prevent power drain thereby from the source of power.

Another and important object of the invention is to provide means automatically to effect the opening of one or the other of the transformer circuits or both when the welding arc is broken and which is automatically connected again when the welding arc is reestablished.

Another object is to provide means for cutting off comparatively high open circuit voltage at the electrode immediate after the welding arc is broken by the operator and to effect a voltage drop to a relatively safe value by a current furnished from a small low rating control transformer.

A further object of the invention relates to the provision of a small low rating control transformer to provide current of a safe voltage when the high open-circuit voltage of the welding transformer is cut off wherein the control transformer obtains power from the same high voltage line that feeds the welding transformer.

The foregoing and other objects of the invention are attained by the arrangement illustrated in the accompanying drawings in which—

Fig. 3 is a circuit diagram of an automatic safety control arrangement for D. C. arc welding showing the motor-generator operated from a 440-volt 3-phase line.

Figure 1:
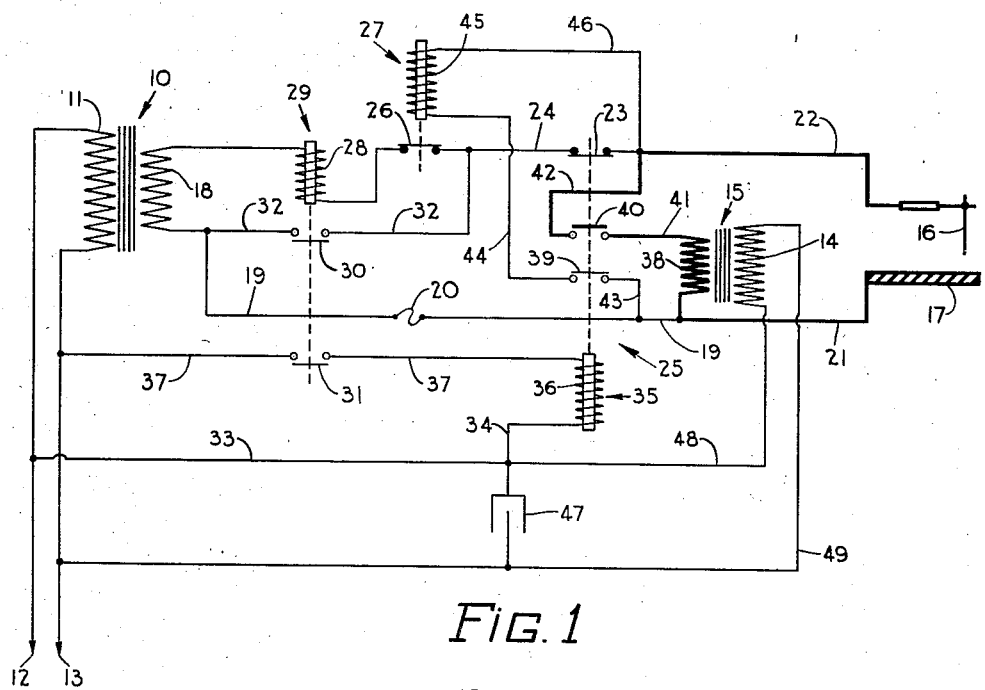
Fig. 1 is a circuit diagram for an A. C. arc welder wherein means are provided for breaking only the secondary circuit of the welding transformer.

The arrangement illustrated in Fig. 1 will operate to isolate the high open-circuit A. C. voltage of the welding transformer from the electrode holder when the welding arc is broken to cease welding, whereupon a control voltage of 24 volts is impressed on the electrode cable while the electrode is not being used for welding. Upon contact of the welding electrode to the work to strike an arc and again commence welding, the control circuit operates to reconnect the welding transformer secondary to the electrode holder and impress full welding voltage of 25 to 40 volts on the welding circuit.

Figure 2:
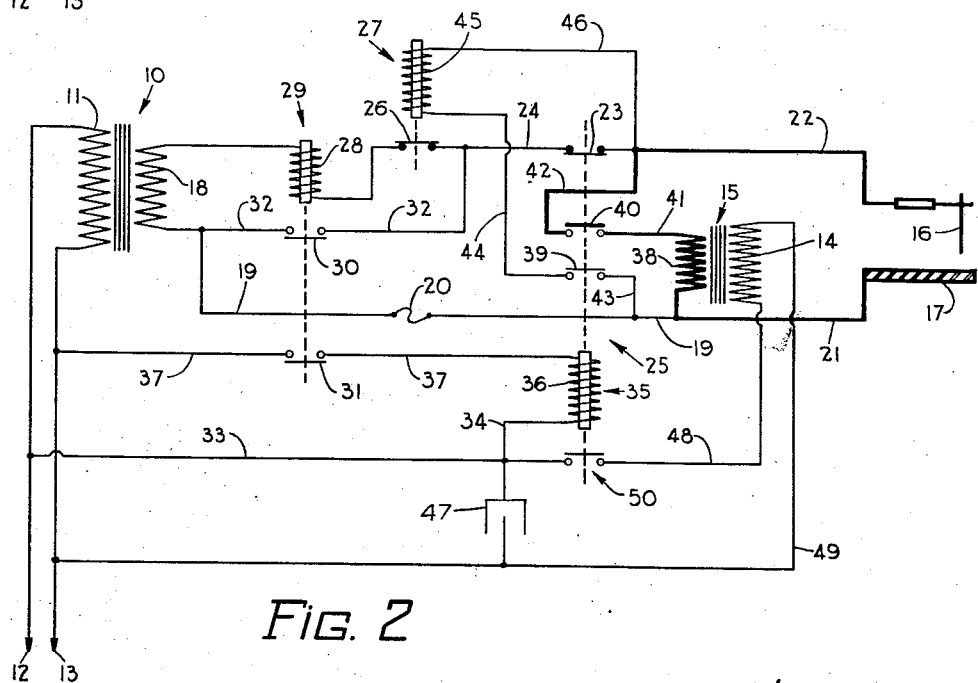
Fig. 2 is a similar diagram wherein means are provided for breaking both the primary and secondary circuits of the welding transformer.

The arrangement shown in Fig. 2 in addition to cutting out the secondary also operates to open the primary circuit of the welding transformer which prevents any power drain by the transformer when it is not being used for welding. It will readily be appreciated that considerable saving in power consumption is thus effected, especially in large shops where a great many arc welders may be connected to the power system.

The circuit for providing the automatic control arrangement for the method of arc welding herein disclosed includes the following elements making up the system as a whole:

A 50 volt ampere step-down transformer 10 provides control energy. The primary winding 11 of the control transformer is connected across the 440 volt lines 12 and 13 which may be of 25 or 60 cycles and the secondary 18 delivers current of 24 volts at 25 or 60 cycles.

The welding transformer 15 also has its primary 14 connected directly across the 440 volt lines 12 and 13 by means of wires 33—48 and 49. The secondary 38 delivers welding current of 25 to 40 volts.

A 24 volt relay 29 controls operation of normally open contactors 30 and 31.

A voltage responsive relay 27 of 115 volts is provided with normally closed contactor 26.

Relay 35, energized directly from the 440 volt lines through the contactor 31 on the control relay, operates power contactor 25 to break the welding transformer secondary circuit 41—42 by means of contact 40. In one phase of the invention a contactor 50 also actuated by this relay operates to break the primary circuit when the welding circuit is opened.

Two interlock contactors, operable by the relay 35, are provided, one of them being a normally closed contact 23 and the other a normally open contact 39. The normally closed interlock functions to isolate the control circuit voltage from the welding circuit voltage when contactor 40 closes and the normally open interlock prevents the control voltage from partially energizing the voltage responsive relay 27 when the contactor 40 is deenergized. This latter feature maintains the relay 27 at a definite pick-up voltage value and thus prevents fluttering of the relay when the circuit operates to close the contactor 40.

A 10 ampere fuse 20 is provided in one leg of the control circuit as protection against burning out of the control relay 29 or its contacts, should the contactor 40 open under load and draw an arc at the contacts which might hang on sufficiently to feed through the normally closed interlock 23 and damage some part of the control circuit. Normally the contactor 40 will not open under load since it is merely an automatic switch operating as an incident to the opening of the welding circuit and is not intended to be used to break the welding current under load but it might open where some mechanical shock disturbs the contacts of relays 27 or 29.

In the operation of the system when the electrode 16 touches the work 17 to strike an arc the following starting circuit is set up to energize the control 29:

From the secondary 18 of the control transformer 10 the current courses through wire 19, including the fuse 20, and wire 21 to the work 17. From the work it passes through the electrode 16, wire 22, normally closed contact 23 of the power contactor 25, through wire 24 and the normally closed contact 26 of the relay 27, thence through the coil 28 of the control relay 29 and back to the other side of the control transformer secondary. With this circuit complete the control relay 29 is, of course, energized to close both of the normally open contacts 30 and 31. When contact 30 closes a holding circuit for the control relay, maintaining the energization of its operating coil 28, is established as follows:

The current travels from the control transformer secondary 18 through wire 32, over the contact 30 and thence to wire 24 through the contact 26 of relay 27 and through coil 28 of the relay 29 back to the secondary of the transformer 10. The control relay coil 28 thus remains energized to hold both contacts 30 and 31 closed until the contact 26 on relay 27 is opened.

An actuating circuit for the power contactor 25 when the control relay closes contact 31 is set up as follows:

Current passes from supply line 12 through wires 33 and 34 to the coil 36 of power contactor relay 35 and through wire 37 over contact 31 of the control relay to the other side 13 of the 440 volt supply line. Thus the operating coil of the relay 35 is energized to actuate the power contactor 25 and thereby close the main current carrying contact 40 and open the normally closed interlock contact 23 and close the normally open interlock contact 39. Closing of the main power contactor 40 sets up the main welding circuit from the secondary 38 of the welding transformer 15 through wire 41 over contact 40 and wires 42 and 22 to the electrode 16. The welding current thus passes through the work 17 and through wire 21 back to the other side of the welding transformer secondary. When the normally closed interlocking contact 23 is opened upon energization of the main power contactor operating coil 36, the voltage of the control transformer 10 is definitely isolated from the heavier voltage of the welding transformer 15, but no change is otherwise had in the operation of the system.

During this same operation of the main power contactor 25, the system is prepared for subsequent welding operations by the closing of normally open interlock contactor 39 which establishes a secondary control or resetting circuit as follows:

Through wires 19 and 43 and over the contactor 39 and the wire 44, current from the welding transformer secondary 38 passes to the coil 45 of voltage responsive relay 27 and then through wires 46 and 42, over contactor 60 and through wire 41 to the other side of the welding transformer secondary. This resetting circuit energizes the relay 27. However, the relay 27 is set to operate only when the voltage has reached a predetermined value and which cannot be reached during the welding operation, since the welding voltage of 25 to 40 volts is not high enough to actuate the relay but only when the electrode 16 is separated from the work 17, thus the relay cannot operate to open its contact 26 until the voltage of the welding transformer secondary has reached the value for which the relay is set. When the electrode is removed from the work the welding current is immediately reduced and the voltage of the secondary 38 instantly rises to a value of from 80 to 105 volts. When the voltage reaches the value for which the voltage responsive relay 27 is set, the relay will operate to open the contact 26 which is disposed in the holding circuit for the control relay 29, and therefore, when contact 26 opens, relay 29 is immediately deenergized and opens both of its contacts 30 and 31. When the contact 31 opens, the operating coil of the power contactor 25 is deenergized allowing the contactor to return to normal position. When the contactor 25 is deenergized, the contact 23 closes to prepare the control circuits for subsequent welding operations and contact 39 opens thereby deenergizing the coil 45 of relay 27 to restore contact 26 to its normally closed position and thus prepare the holding circuit for the control relay 29 for the next welding operation. As the contactor 25 is restored to normal deenergized position, the main power contact 40 opens to break the welding circuit through the welding transformer 15 and the electrode 16, thus isolating the welding transformer secondary from the electrode and restoring the 24 volt control voltage to the electrode.

The primary winding 14 of the welding transformer may also be cut out of the circuit simultaneously with the secondary 38 thereby eliminating all high voltage when the welding operation is not being performed. An additional contact 50, as shown in Fig. 2, operable with the main power contactor 25, is disposed in the one side 33—48 of the circuit 33—48 and 49 from the 440 volt circuit 12 and 13 to the welding transformer primary, thereby to open the circuit through the primary at the same time that the circuit through the secondary is opened by means of the contact 40. In this manner all high voltage is automatically eliminated as soon as each welding operation is completed and the circuit is reset for subsequent operations. This automatic cutting out of the high voltage not only increases the safety of A. C. arc-welding but also eliminates the power consumption of the welding transformer when the welding machine is not actually welding and this power saving will be appreciable in any plant where a large number of arc welders are connected to the power lines. When welding transformers not under load are left on the power line, their power factor is very low since the load is highly inductive and this low power factor load tends to drag down the system power factor. Removing idle transformers from the line by automatically disconnecting the welding transformer primary, appreciably improves the system power factor. As shown in Figs. 1 and 2, a power factor corrective device may be utilized in the form of a capacitor 47 indicated as being connected across the lines 33 and 49 leading from the supply lines 12 and 13 to the primary 14 to improve the power factor, and disposed as shown, the capacitor would be left on the 440 volt line at all times thereby to obtain the corrective benefit of the power system improvement whether the welding operation is being performed or not.

A particular feature of the foregoing arrangement lies in the fact that it provides a normally deenergized control circuit which is not disconnected during welding operations and wherein the relays 29 and 27 and the contactor 40 have no current flowing through them when the electrode is not welding and the use of the normally closed interlock contactor 23 to isolate the control circuit voltage completely from the welding circuit voltage whereby the control circuit and the welding circuit operate entirely independently of each other is especially advantageous because it enables the relays to operate at their intended voltage values without any vibration or chattering of contacts.

The automatic safety features of this invention may also be utilized in connection with D. C. arc welders and such an arrangement is illustrated in Fig. 3 wherein a 3-phase A. C. motor 60, for driving the welding generator 61 by means of shaft 59, is shown as connected across the 3-phase supply lines 62, 63 and 64. The 50-volt ampere control transformer 65 has its primary 66 also connected across the 440 volt supply lines 62 and 63.

In the operation of the D. C. arrangement when the electrode 68 is engaged with the work 69, a control circuit is established from the 24 volt secondary 67 of the control transformer through wire 70, including a 10 ampere fuse 71, and wire 72 to the work 69. From the work the current passes through the electrode 68, wire 73, through wire 74, passing over normally closed contacts 75 and 76 and through coil 77 of the control relay 80 to the other side of the control transformer secondary. Completion of this starting circuit energizes the control relay 80 which closes both of the normally open contacts 78 and 79. When the contact 78 is closed, a holding circuit for maintaining the energization of the control relay is set up from the secondary 67 through wire 81, over contact 78 and through wire 74, over contact 76 of the relay 82 and through coil 77 of the control relay back to the other side of the secondary thereby to maintain the energization of the relay 80 to hold both of its contacts 78 and 79 closed until the contact 76 on voltage responsive relay 82 is opened.

Closing of the contact 79 by the energization of the control relay 80 completes an actuating circuit for the main power contactor 85. The current passes from the A. C. supply line 62 through wire 83 to the relay coil 84 of the main power contactor 85 and then through wire 86 over contact 79 back to the other side of the A. C. supply line 63. Energization of the main power contactor relay coil 84 by the completion of this circuit actuates the contactor to close its main current carrying contact 90 and opens the interlock contact 75 in the starting circuit and also closes the interlock contact 87. When the main power contact 90 closes the welding circuit is completed from the negative side of the welding generator 61 through wire 88, passing over contact 90 and wire 73 to the electrode 68. The welding current passes through the work 69 from the electrode and through wire 72 back to the other side or positive terminal of the welding generator. Opening of the interlock contact 75 at the same time that the main power contact is closed does not cause any change in operation but definitely isolates the voltage of the control transformer circuit from the relatively higher voltage of the welding generator. The interlock contact 87 is closed during the same operation of opening the contact 75 and closing the main contact 90 and this prepares the system for subsequent welding operations by setting up a secondary control or resetting circuit with the current traveling from the positive terminal of the D. C. welding generator through wires 72, 70 and 91 to the operating coil 89 of voltage responsive relay 82, then through wire 92 over the interlock contact 87 to wire 74 and thence through wire 88 and over main contact 90 to the negative terminal of the welding generator. This resetting circuit energizes the voltage responsive relay 82 but this relay cannot operate to open its contact 76 until the voltage of the welding generator has risen to the predetermined value for which the relay is set to operate and which does not occur during the welding operation but only when the welding electrode 68 is removed from the work 69 at which time the welding current is immediately reduced and the voltage of the welding generator instantly rises and when it reaches the value for which the relay 82 is set, the relay operates to open its contact 76. The contact 76 is disposed in the holding circuit which maintains the energization of the operating coil 77 of the control relay 80 and when the contact opens, the control relay is immediately deenergized and opens both of its contacts 78 and 79. When the contact 79 opens, the operating coil 84 of the main power contactor 85 is deenergized and the contactor returns to its normal position at which time the contact 75 has closed, preparing the control circuits for the next welding operation, contact 87 has opened, deenergizing the operating coil 89 of voltage responsive relay 82 to restore the contact 76 to its normally closed position and prepare the holding circuit for the control relay 80 for another welding operation and the main power contactor 90 has opened to break the welding circuit between the D. C. generator and the welding electrode thus isolating the welding generator from the electrode.

From the foregoing it will be seen that an automatic safety control circuit for arc welding has been provided which may be utilized for either A. C. or D. C. welders whereby a single control arrangement applicable to either may be standardized with only the necessity of ascertaining the particular type of voltage responsive relay to be used in the resetting circuit before application of the arrangement to one or the other system, since the D. C. system uses only this one D. C. relay in the circuit, all of the remaining relays operating either from the A. C. power lines or the A. C. control circuit.

What is claimed is:

1. An automatic safety control circuit including an alternating current source of power, a work circuit, a transformer in said circuit having its primary connected to the source of power and having a secondary delivering work current, a control transformer in the circuit having its primary connected to said source of power and a secondary delivering control current, a control relay in circuit with the control transformer secondary adapted to be energized upon completion of a starting circuit initiated by loading the work circuit, a holding circuit for maintaining the energization of the relay, a contact on the relay adapted to complete said holding circuit upon energization of the relay, a power contactor relay adapted to be connected in circuit with the source of power, a second contact on the control relay in the actuating circuit for said power contactor relay adapted to initiate energization of the last-named relay from said source of power, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, a third contact on the power contactor relay adapted to complete a resetting circuit from the work circuit transformer secondary to energize said voltage responsive relay and open said contact in the holding circuit, and a fourth contact actuated by the power contactor relay adapted to disconnect the work circuit transformer primary from said source of power when the work circuit is unloaded.

2. An automatic safety control circuit including an alternating current source of power, a work circuit, a transformer in said circuit having its primary connected to the source of power and having a secondary delivering work current, a control transformer in the circuit having its primary connected to said source of power and a secondary delivery control current, a control relay in circuit with the control transformer secondary adapted to be energized upon completion of a starting circuit initiated by loading the work circuit, a holding circuit for maintaining the energization of the relay, a power contactor relay adapted to be connected in circuit with the source of power, a contact on the control relay in the actuating circuit for said power contactor relay adapted to initiate energization of the last-named relay from said source of power, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, a third contact on the power contactor relay adapted to complete a resetting circuit from the work circuit transformer secondary to energize said voltage responsive relay and open said contact in the holding circuit, and a fourth contact actuated by the power contactor relay adapted to disconnect the work circuit transformer primary from said source of power when the work circuit is unloaded.

3. An automatic safety control circuit including an alternating current source of power, a work circuit, a transformer in said circuit having its primary connected to the source of power and having a secondary delivering work current, a control transformer in the circuit having its primary connected to said source of power and a secondary delivering control current, a control relay in circuit with the control transformer secondary adapted to be energized upon completion of a starting circuit initiated by loading the work circuit, a power contactor relay adapted to be connected in circuit with the source of power, a contact on the control relay in the actuating circuit for said power contactor relay adapted to initiate energization of the last-named relay from said source of power, said power contactor relay having a main contact adapted to complete the work circuit through said work circuit transformer secondary upon energization of the power contactor relay, a second contact on the last-named relay adapted to isolate the work circuit from said control current when the power contactor relay is energized, and a contact actuated by the power contactor relay adapted to disconnect the work circuit transformer primary from said source of power when the work circuit is unloaded.

4. An automatic safety control circuit including an alternating current source of power, a work circuit, a transformer in said circuit having its primary connected to the source of power and having a secondary delivering work current, a control transformer having a secondary delivering control current, a control relay adapted to be energized upon completion of a starting circuit initiated by loading the work circuit, a holding circuit for maintaining the energization of the relay, a power contactor relay connected in the circuit, a contact on the control relay in the actuating circuit for said power contactor relay adapted to initiate energization of the last-named relay, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, a third contact on the power contactor relay adapted to complete a resetting circuit to energize said voltage responsive relay and open said contact in the holding circuit, and a fourth contact actuated by the power contactor relay adapted to disconnect the work circuit transformer primary from said source of power when the work circuit is unloaded.

5. An automatic safety control circuit including an alternating current source of power, a work circuit, a transformer in said circuit having its primary connected to the source of power and having a secondary delivering work current, a control transformer in the circuit having its primary connected to said source of power and a secondary delivering control current, a control relay in circuit with the control transformer secondary adapted to be energized upon completion of a starting circuit initiated by loading the work circuit, a holding circuit for maintaining the energization of the relay, a contact on the relay adapted to complete said holding circuit upon energization of the relay, a power contactor relay adapted to be connected in circuit with the source of power, a second contact on the control relay in the actuating circuit for said power contactor relay adapted to initiate energization of the last-named relay from said source of power, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, and a third contact on the power contactor relay adapted to complete a resetting circuit from the work circuit transformer secondary to energize said voltage responsive relay and open said contact in the holding circuit.

6. An automatic safety control circuit including an alternating current source of power, a work circuit, a transformer in said circuit having its primary connected to the source of power and having a secondary delivering work current, a control transformer in the circuit having its primary connected to said source of power and a secondary delivering control current, a control relay in circuit with the control transformer secondary adapted to be energized upon completion of a starting circuit initiated by loading the work circuit, a holding circuit for maintaining the energization of the relay, a power contactor relay adapted to be connected in circuit with the source of power, a contact on the control relay in the actuating circuit for said power contactor relay adapted to initiate energization of the last-named relay from said source of power, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, and a third contact on the power contactor relay adapted to complete a resetting circuit from the work circuit transformer secondary to energize said voltage responsive relay and open said contact in the holding circuit.

7. An automatic safety control circuit including an alternating current source of power, a work circuit, a transformer in said circuit having its primary connected to the source of power and having a secondary delivering work current, a control transformer in the circuit having its primary connected to said source of power and a secondary delivering control current, a control relay in circuit with the control transformer secondary adapted to be energized upon completion of a starting circuit initiated by loading the work circuit, a power contactor relay adapted to be connected in circuit with the source of power, a contact on the control relay in the actuating circuit for said power contactor relay adapted to initiate energization of the last-named relay from said source of power, said power contactor relay having a main contact adapted to complete the work circuit through said work circuit transformer secondary upon energization of the power contactor relay, and a second contact on the last-named relay adapted to isolate the work circuit from said control current when the power contactor relay is energized.

8. An automatic safety control circuit including an alternating current source of power, a work circuit, a transformer in said circuit having its primary connected to the source of power and having a secondary delivering work current, a control transformer having a secondary delivering control current, a control relay adapted to be energized upon completion of a starting circuit initiated by loading the work circuit, a holding circuit for maintaining the energization of the relay, a power contactor relay connected in the circuit, a contact on the control relay in the actuating circuit for said power contactor relay adapted to initiate energization of the last-named relay, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, and a third contact on the power contactor relay adapted to complete a resetting circuit to energize said voltage responsive relay and open said contact in the holding circuit.

9. An automatic safety control circuit including an alternating current source of power, a work circuit, a transformer in said circuit having its primary connected to the source of power and having a secondary delivering work current, a control transformer having a secondary delivering control current, a control relay adapted to be energized upon completion of a starting circuit initiated by loading the work circuit, a holding circuit for maintaining the energization of the relay, a power contactor relay connected in the circuit, a contact on the control relay in the actuating circuit for said power contactor relay adapted to initiate energization of the last-named relay, said power contactor relay having a main contact adapted to complete the work circuit through said work circuit transformer secondary upon energization of the power contactor relay, a second contact on the last-named relay adapted to isolate the work circuit from said control current when the power contactor relay is energized, a voltage responsive relay having a contact disposed in the holding circuit for said control relay, a third contact on the power contactor relay adapted to complete a resetting circuit to energize said voltage responsive relay and open said contact in the holding circuit, and a capacitor located in the circuit to said work circuit transformer primary.

10. An automatic safety control circuit including an alternating current source of power, supplying a work circuit, a control transformer having its primary connected to said source of power and having a secondary delivering control current, a control relay in circuit with said secondary adapted to be energized upon completion of a starting circuit initiated by loading said work circuit, a holding circuit for maintaining the energization of said relay, a power contactor relay in circuit with said source of power, a contact on the control relay in said circuit for the power contactor relay adapted to cause energization of the last-named relay, said power contactor relay having a main contact adapted to connect the work circuit through said source of power to a load upon energization of the power contactor relay, a second contact on the power contactor relay adapted to isolate the work circuit from said control current when said relay is energized, a voltage responsive relay having a contact in the holding circuit for the control relay, and a third contact on the power contactor relay adapted to complete a resetting circuit from said source of power to energize said voltage responsive relay and open said contact in the holding circuit.

RALPH S. KENRICK